(12) United States Patent
Chen et al.

(10) Patent No.: US 11,728,739 B1
(45) Date of Patent: Aug. 15, 2023

(54) POWER CONVERTER

(71) Applicant: P-DUKE TECHNOLOGY CO., LTD., Taichung (TW)

(72) Inventors: Lien-Hsing Chen, Taichung (TW); Ching-Ming Lai, Taichung (TW); Sheng-Ken Huang, Taichung (TW)

(73) Assignee: P-DUKE TECHNOLOGY CO., LTD., Taichung (TW)

( * ) Notice: Subject to any disclaimer, the term of this patent is extended or adjusted under 35 U.S.C. 154(b) by 0 days.

(21) Appl. No.: 17/876,079

(22) Filed: Jul. 28, 2022

(30) Foreign Application Priority Data

May 19, 2022 (TW) .................................. 111118614

(51) Int. Cl.
*H02M 1/084* (2006.01)
*H02M 3/335* (2006.01)
*H02M 1/08* (2006.01)

(52) U.S. Cl.
CPC ......... *H02M 3/33576* (2013.01); *H02M 1/08* (2013.01)

(58) Field of Classification Search
CPC ...... H02M 1/08; H02M 1/084; H02M 1/0845; H02M 3/156; H02M 3/157; H02M 3/158; H02M 3/33507; H02M 3/33515; H02M 3/33546; H02M 3/33569; H02M 3/33576
See application file for complete search history.

(56) References Cited

U.S. PATENT DOCUMENTS

| | | | |
|---|---|---|---|
| 6,392,902 B1 * | 5/2002 | Jang .................. | H02M 3/33573 363/56.02 |
| 11,646,670 B2 * | 5/2023 | Jin ..................... | H02M 3/33592 363/21.04 |
| 2004/0070376 A1 | 4/2004 | Hoshino et al. | |
| 2007/0247875 A1 | 10/2007 | Ackermann et al. | |
| 2021/0408924 A1 * | 12/2021 | Jin ......................... | H02M 3/01 |
| 2022/0255456 A1 * | 8/2022 | Jin .................... | H02M 3/33592 |

* cited by examiner

*Primary Examiner* — William Hernandez
(74) *Attorney, Agent, or Firm* — Birch, Stewart, Kolasch & Birch, LLP

(57) ABSTRACT

A power converter includes a first contact, a second contact, a third contact, a fourth contact, a first ground contact, a second ground contact, a transformer, and a first switching element to a fifth switching element. The first switching element to the fifth switching element is controllable to switch on or off to form a first configuration and a second configuration, wherein the first configuration allows a power input to the first contact to be transmitted to the third contact through a first side of the transformer, and the second configuration allows a power input to the second contact to be transmitted to the fourth contact through the first side to a second side of the transformer, thereby to distribute the DC power in the same circuit structure.

11 Claims, 15 Drawing Sheets

FIG.9

POWER CONVERTER

BACKGROUND OF THE INVENTION

Technical Field

The present invention relates generally to a power converting system, and more particularly to a power converter.

Description of Related Art

A conventional DC/DC converter typically has a single input port and a single output port, and can simply convert a power from the input port to the output port for output. Multiple DC/DC converters are required for power distribution when applied to a grid that needs to supply multiple loads.

A conventional power converter is illustrated in FIG. 1 and includes two DC/DC converters 100, wherein an input port of each of the DC/DC converters 100 is connected to a DC grid for receiving power, and an output port of one of the DC/DC converters 100 is connected to a first load Ld1, and an output port of the other DC/DC converter 100 is connected to a second load Ld2. In addition, the conventional power converter could further provide with a remote control device to become a passive converter, thereby respectively controlling each of the DC/DC converters 100 to output or stop outputting electricity to the first load Ld1 or the second load Ld2. The system has to add additional power converters when needs to supply power to multiple loads, which increases the number of components and the cost.

BRIEF SUMMARY OF THE INVENTION

In view of the above, the primary objective of the present invention is to provide a power converter, which could distribute DC power in the same circuit structure.

The present invention provides a power converter, including a first contact, a second contact, a third contact, a fourth contact, a first ground contact, a second ground contact, a transformer, and a first switching element to a fifth switching element. The transformer includes a first side and a second side, wherein the first side has a first winding and a second winding. The first winding has a first end and a second end. The second winding has a first end and a second end. The second side has a third winding and a fourth winding. The third winding has a first end and a second end. The fourth winding has a first end and a second end. The second end of the third winding is electrically connected to fourth contact, and the first end of the fourth winding is electrically connected to the second ground contact.

The first switching element has a first end and a second end, wherein the first end of the first switching element is electrically connected to the third contact, and the second end of the first switching element is electrically connected to the first end of the first winding. The second switching element has a first end and a second end, wherein the first end of the second switching element is electrically connected to the first end of the first winding and the second end of the first switching element. The second end of the second switching element is electrically connected to the first ground contact. The third switching element has a first end and a second end, wherein the second end of the third switching element is electrically connected to the second end of the second switching element and the first ground contact. The first end of the third switching element is electrically connected to the second end of the fourth winding. The fourth switching element has a first end and a second end, wherein the first end of the fourth switching element is electrically connected to the second end of the second winding, the first end of the third winding, and the first contact. The second end of the fourth switching element is electrically connected to the first end of the fourth winding and the second ground contact. The fifth switching element has a first end and a second end, wherein the first end of the fifth switching element is electrically connected to the second end of the third winding and the fourth contact. The second end of the fifth switching element is electrically connected to the second end of the fourth winding and the first end of the third switching element. The first switching element, the second switching element, the third switching element, the fourth switching element, and the fifth switching element are controllable to form one of a plurality of configurations; the configurations comprise a first configuration and a second configuration.

When in the first configuration, the third switching element, the fourth switching element, and the fifth switching element are cut off, and the first switching element and the second switching element start with a first phase of the first configuration, and then alternately switch between the first phase of the first configuration and a second phase of the first configuration. When in the first phase of the first configuration, the first switching element is cut off, and the second switching element switches on, while when in the second phase of the first configuration, the first switching element switches on, and the second switching element cut off, thereby allowing a power input to the first contact to be transmitted to the third contact through the first side of the transformer.

When in the second configuration, the first switching element and the second switching element are cut off, and the third switching element, the fourth switching element, and the fifth switching element start with a first phase of the second configuration, and then alternately switch between the first phase of the second configuration and a second phase of the second configuration. When in the first phase of the second configuration, the third switching element switches on, and the fourth switching element and the fifth switching element cut off, while when in the second phase of the second configuration, the third switching element cut off, and the fourth switching element and the fifth switching element switch on, thereby allowing a power input to the second contact to be transmitted to the fourth contact through the first side to the second side of the transformer.

With the aforementioned design, the plurality of switching elements could be controlled to form one of the plurality of configurations, thereby distributing the DC power in the same circuit structure by the power transmission and distribution through the configurations.

BRIEF DESCRIPTION OF THE SEVERAL VIEWS OF THE DRAWINGS

The present invention will be best understood by referring to the following detailed description of some illustrative embodiments in conjunction with the accompanying drawings, in which

FIG. 9 is a schematic view showing the power converter operates in the second phase of the third mode;

DETAILED DESCRIPTION OF THE INVENTION

Figure 1:
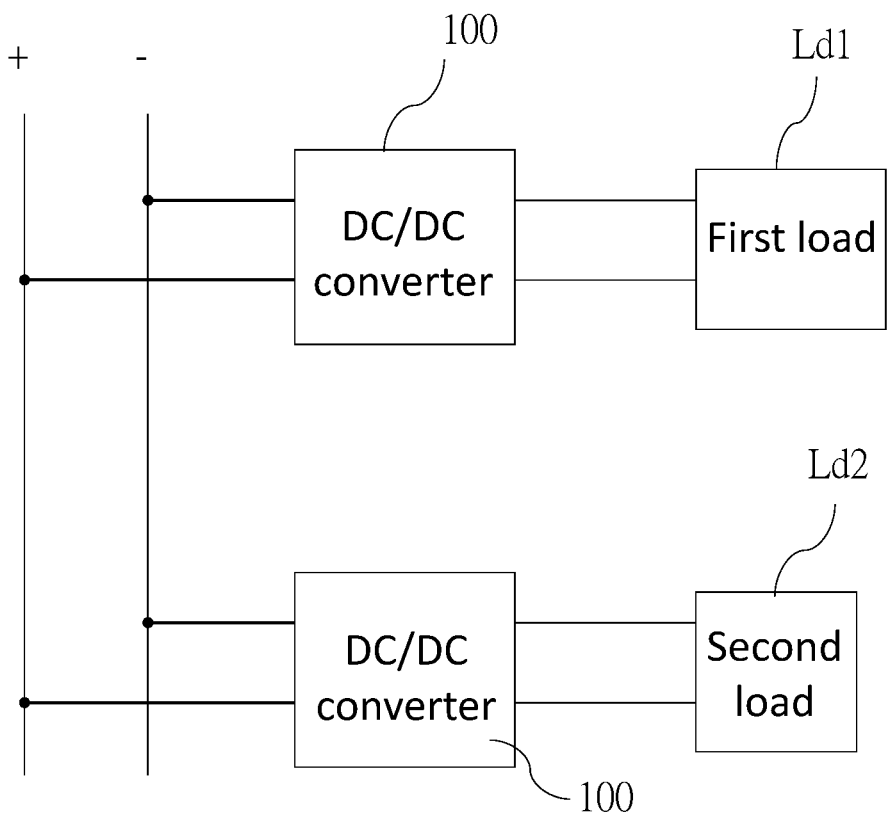
FIG. 1 is a schematic view of the conventional power converter.
Figure 2:
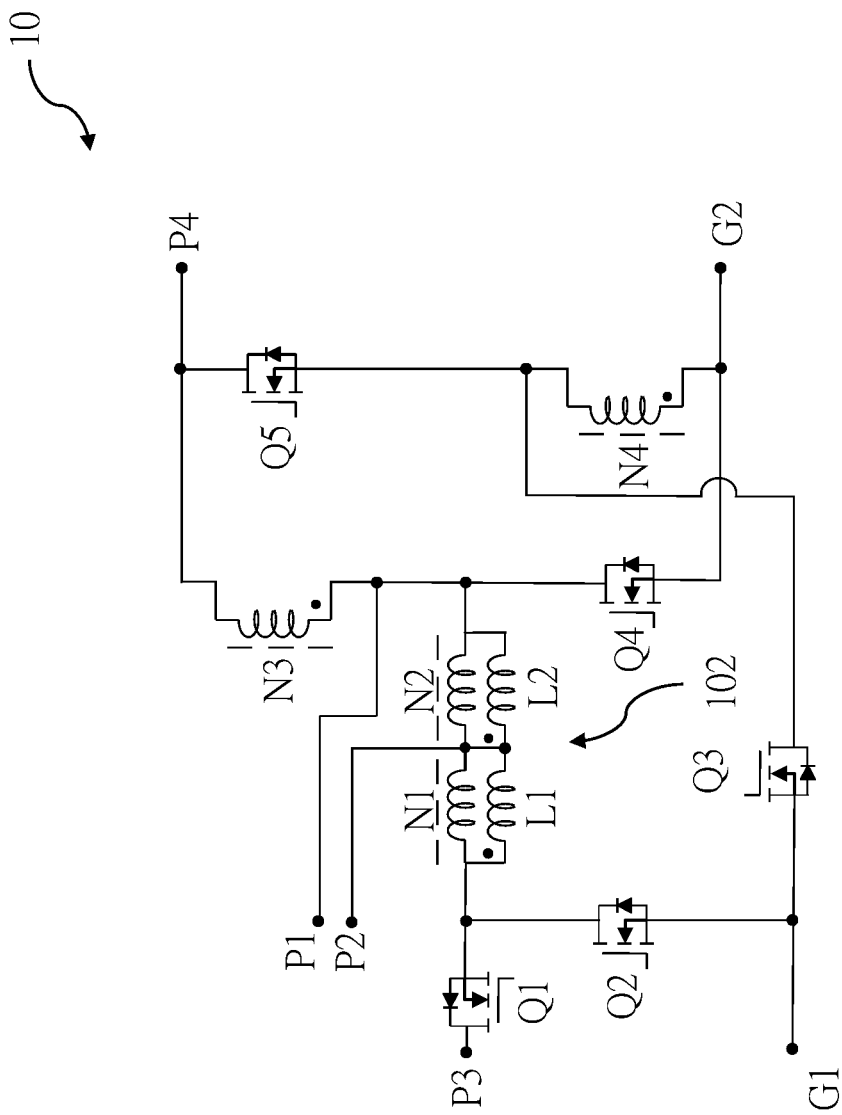
FIG. 2 is a block diagram of the DC/DC converter of the power converter according to an embodiment of the present invention.
Figure 3:
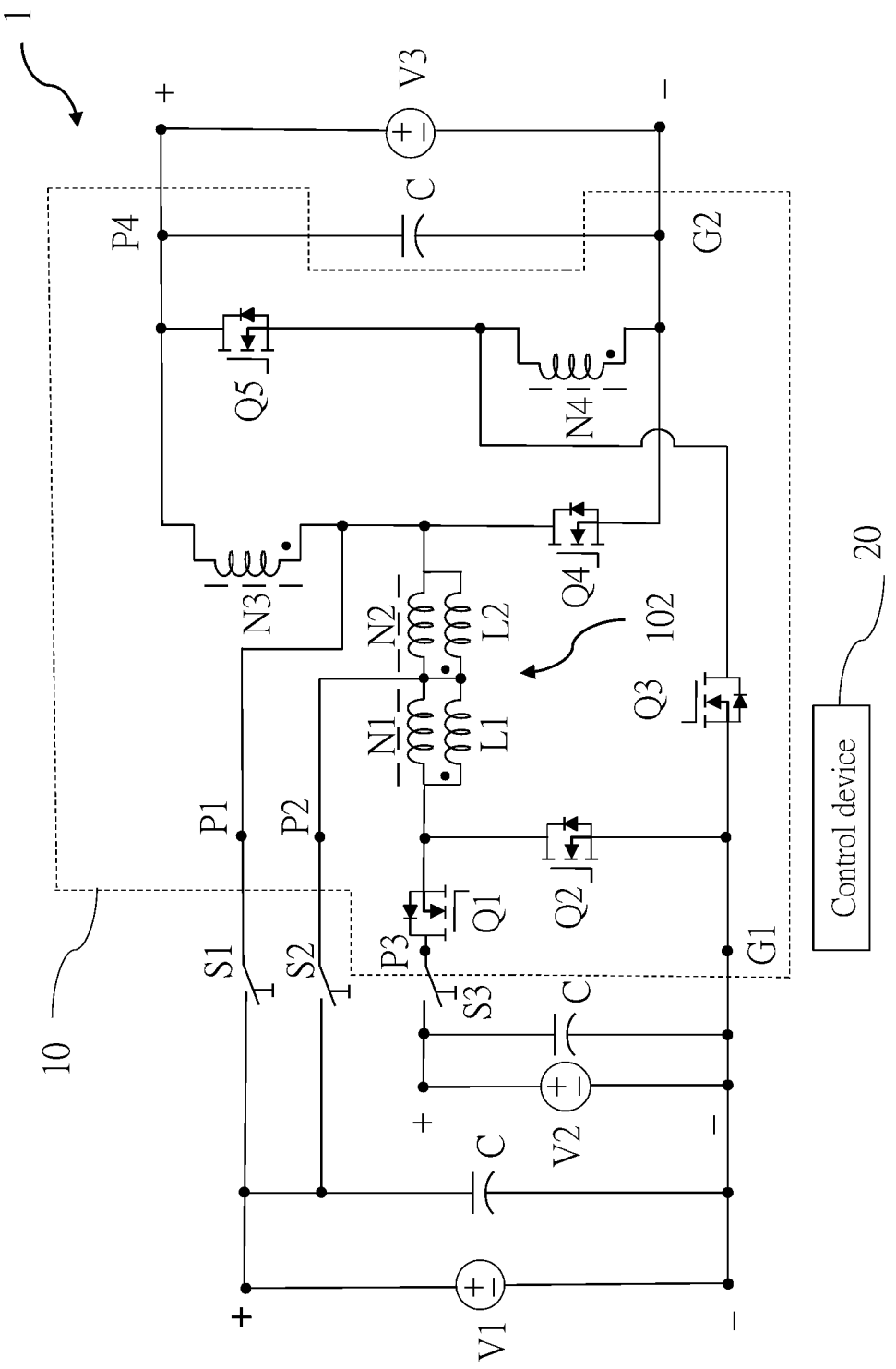
FIG. 3 is a block diagram of the power converter according to the embodiment of the present invention.

A power converter 1 according to an embodiment of the present invention is illustrated in FIG. 2 and FIG. 3 and includes a DC/DC converter 10.

The DC/DC converter 10 includes a first contact P1, a second contact P2, a third contact P3, a fourth contact P4, a first ground contact G1, a second ground contact G2, a plurality of switching elements Q1-Q5, and a transformer 102.

The first contact P1 and the first ground contact G1, the second contact P2 and the first ground contact G1, the third contact P3 and the first ground contact G1, and the fourth contact P4 and the second ground contact G2 could be respectively and electrically connected to a power source or a load. In the current embodiment, the first contact P1 and the first ground contact G1, the second contact P2 and the first ground contact G1, the third contact P3 and the first ground contact G1, and the fourth contact P4 and the second ground contact G2 are respectively and electrically connected to a power source as an example for illustration, wherein the power source could be a DC grid, an energy storage system (e.g. an energy storage device of an electric vehicle or an energy storage cabinet for emergency power switch), or a solar battery.

Referring to FIG. 3, the first contact P1, the second contact P2, the third contact P3, and the fourth contact P4 could be respectively connected to a capacitor C in parallel, thereby filtering the connected DC power source through the capacitor C. Additionally, in the current embodiment, the power converter 1 further includes a plurality of selection switches S1-S3 and a control device 20. The selection switches S1-S3 include a first selection switch S1, a second selection switch S2, and a third selection switch S3, wherein the first selection switch S1 is coupled to the first contact P1, and the second selection switch S2 is coupled to the second contact P2, and the third selection switch S3 is coupled to the third contact P3. The control device 20 is electrically connected to the first selection switch S1, the second selection switch S2, and the third selection switch S3, and could selectively control the first selection switch S1, the second selection switch S2, or the third selection switch S3 to switch on or cut off.

The first contact P1 and the second contact P2 are coupled to a positive terminal of a DC power source, and the first ground contact G1 is coupled to a negative terminal of the DC power source, wherein the DC power source is a DC grid V1 as an example. In the current embodiment, the first contact P1 is coupled to a positive terminal of the DC grid V1 via the first selection switch S1, and the second contact P2 is coupled to the positive terminal of the DC grid V1 via the second selection switch S2, wherein the DC grid V1 is, but not limited to, DC 360-420V. The control device 20 could selectively control the first selection switch S1 or the second selection switch S2 to switch on, allowing the positive terminal of the DC grid V1 to be conductively connected to the first contact P1 or the second contact P2.

The third contact P3 and the first ground contact G1 are respectively and detachably coupled to a positive terminal and a negative terminal of a first energy storage system V2, wherein the first energy storage system V2 could be an energy storage device of an electric vehicle. In the current embodiment, the third contact P3 is coupled to the positive terminal of the first energy storage system V2 via the third selection switch S3, wherein an operating voltage range of the first energy storage system V2 is, but not limited to, 400-800V. In the current embodiment, the operating voltage range and a voltage range of the DC grid V1 partially overlap, and a voltage of the first energy storage system V2 is greater than a voltage of the DC grid V1. The control device 20 could selectively control the third selection switch S3 to switch on, allowing the positive terminal of the first energy storage system V2 to be conductively connected to the third contact P3.

The fourth contact P4 and the second ground contact G2 are coupled to another energy storage system (hereafter called a second energy storage system V3), wherein the second energy storage system V3 could be an energy storage cabinet for emergency power supply. In the current embodiment, an operating voltage range of the second energy storage system V3 is, but not limited to, 32-65V.

In other words, the voltage of the first energy storage system V2 is the largest, the voltage of the DC grid V1 is second, and a voltage of the second energy storage system V3 is the smallest.

The transformer 102 is a center-tapped transformer, which could provide a performance with high voltage conversion ratio. However, the transformer is not limited to being the center-tapped transformer, but could be a coupling transformer or a coupling inductance. The transformer 102 includes a first side and a second side, wherein the first side is a high side, and the second side is a low side. The first side has a first winding N1 and a second winding N2, wherein the first winding N1 has a first end and a second end, and the second winding N2 has a first end and a second end. In practice, according to the characteristics of the first winding N1 and the second winding N2, a first magnetizing inductance L1 and a second magnetizing inductance L2 are respectively disposed between the first end and the second end of the first winding N1 and the first end and the second end of the second winding N2. The second side has a third winding N3 and a fourth winding N4, wherein the third winding N3 has a first end and a second end, and the fourth winding N4 has a first end and a second end. The second end of the third winding N3 is electrically connected to the fourth contact P4, and the first end of the fourth winding N4 is electrically connected to the second ground contact G2. A turn number of the first winding N1 to the fourth winding N4 are respectively denoted as n1-n4, wherein n1 and n2 are greater than n3 and n4; n3=n4; n1 and n2 are set as n1>n2, n1=n2, or n1<n2 depending on a ratio of a voltage v1 across the second winding N2 and a voltage v2 across the first winding N1 and the second winding N2, preferably, satisfying v1:v2=n2:(n1+n2).

Each of the switching elements has a first end, a second end, and a control end, thereby controlling the conduction between each of the first ends and each of the second ends by an electrical signal input to each of the control ends. The switching elements include a first switching element Q1, a second switching element Q2, a third switching element Q3, a fourth switching element Q4, and a fifth switching element Q5, wherein the first end of the first to fifth switching element Q1-Q5 is a drain, and the second end of the first to fifth switching element Q1-Q5 is a source, and the control end of the first to fifth switching element Q1-Q5 is a gate. The switching elements could be semi-conductor switching elements (e.g. silicon carbide MOSFETs or power MOSFETs) or could be bipolar transistors or insulated gate bipolar transistors (IGBT). The first selection switch S1, the second selection switch S2, and the third selection switch S3 could be semi-conductor switching elements or mechanical switches (e.g. relays, contactors, etc.).

The second end of the first switching element Q1 is electrically connected to the first end of the first winding N1, and the first end of the first switching element Q1 is electrically connected to the third contact P3.

The first end of the second switching element Q2 is electrically connected to the first end of the first winding N1 and the second end of the first switching element Q1, and the second end of the second switching element Q2 is electrically connected to the first ground contact G1.

The first end of the third switching element Q3 is electrically connected to the second end of the fourth winding N4, and the second end of the third switching element Q3 is electrically connected to the first ground contact G1 and the second end of the second switching element Q2.

The first end of the fourth switching element Q4 is electrically connected to the second end of the second winding N2, the first end of the third winding N3, and the first contact P1, and the second end of the fourth switching element Q4 is electrically connected to the first end of the fourth winding N4 and the second ground contact G2.

The second end of the fifth switching element Q5 is electrically connected to the second end of the fourth winding N4 and the first end of the third switching element Q3, and the first end of the fifth switching element Q5 is electrically connected to the second end of the third winding N3 and the fourth contact P4.

The first switching element Q1 to the fifth switching element Q5 are controllable to form one of a plurality of configurations and provide different power switching effects according to different configurations, wherein the configurations at least include a first configuration and a second configuration. In the current embodiment, the configurations further include a third configuration, a fourth configuration, a fifth configuration, and a sixth configuration. In practice, the configurations could include not only the first configuration and the second configuration but also at least one of the third configuration to the sixth configuration.

The control device 20 is electrically connected to the control end of the switching elements and respectively controls each of the switching elements to switch on or cut off. The control device 20 takes one of a plurality of control modes, wherein the control modes include a first control mode to a sixth control mode for respectively controlling the switching elements to form the first configuration to the sixth configuration.

In the current embodiment, the control device 20 is electrically connected to the DC grid V1, the first energy storage system V2, and the second energy storage system V3, and detects voltage states of the DC grid V1, the first energy storage system V2, and the second energy storage system V3 to determine one of the control modes to be taken. For instance, the control device 20 could respectively detect an instant voltage of the DC grid V1, the first energy storage system V2, and the second energy storage system V3. However, the control device 20 is not limited to detecting the voltages of the DC grid V1, the first energy storage system V2, and the second energy storage system V3, but could receive an external selection command to select one of the control modes to be executed.

Referring to FIG. 4 to FIG. 15, the first control mode to the sixth control mode will be described in detail herein.

The First Control Mode

The control device 20 controls the first selection switch S1 and the third selection switch S3 to switch on and controls the second selection switch S2 to cut off, thereby allowing the first contact P1 and the first ground contact G1 to be respectively and conductively connected to the positive terminal and the negative terminal of the DC grid V1, and allowing the third contact P3 and the first ground contact G1 to be respectively and conductively connected to the positive terminal and the negative terminal of the first energy storage system V2.

When the control device 20 detects that the voltage of the first energy storage system V2 is smaller than a first predetermined voltage which is 480V as an example, the control device 20 controls the first switching element Q1 to the fifth switching element Q5 to form the first configuration. In the current embodiment, the control device 20 controls the first switching element Q1 to the fifth switching element Q5 to form the first configuration when the control device 20 determines that the DC grid V1 is in an off-peak power consumption status and the voltage of the first energy storage system V2 is smaller than the first predetermined voltage. A message that the DC grid V1 is in the off-peak power consumption status or a peak power consumption status could be externally transmitted to the control device 20 for the control device 20 to determine.

Figure 4:
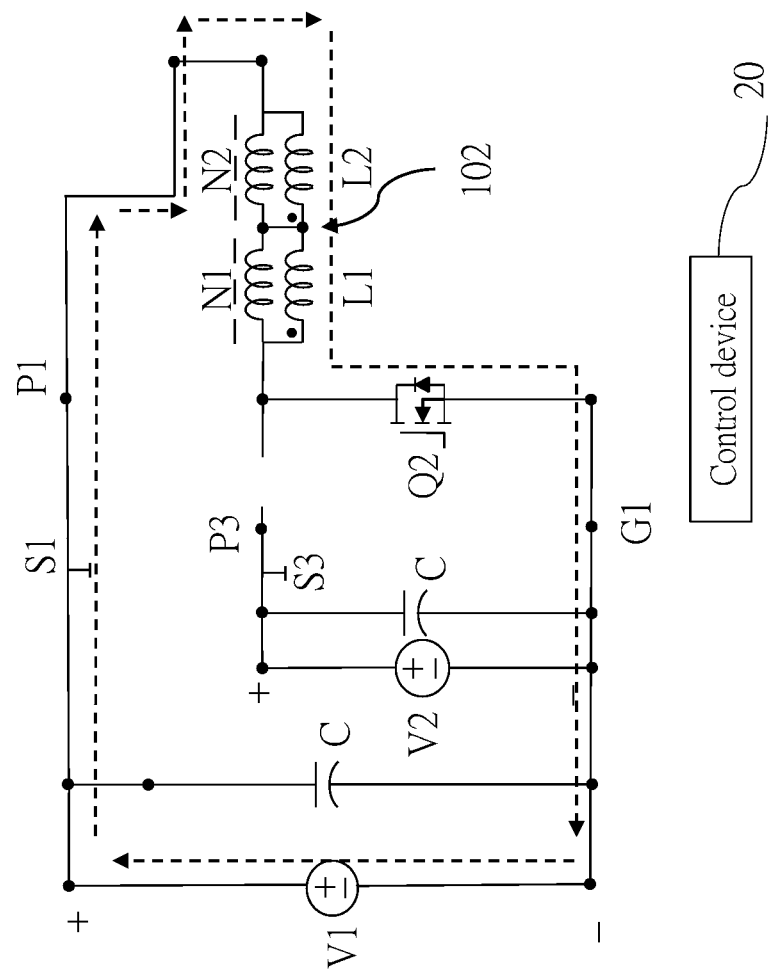
FIG. 4 is a schematic view showing the power converter operates in the first phase of the first mode.
Figure 5:
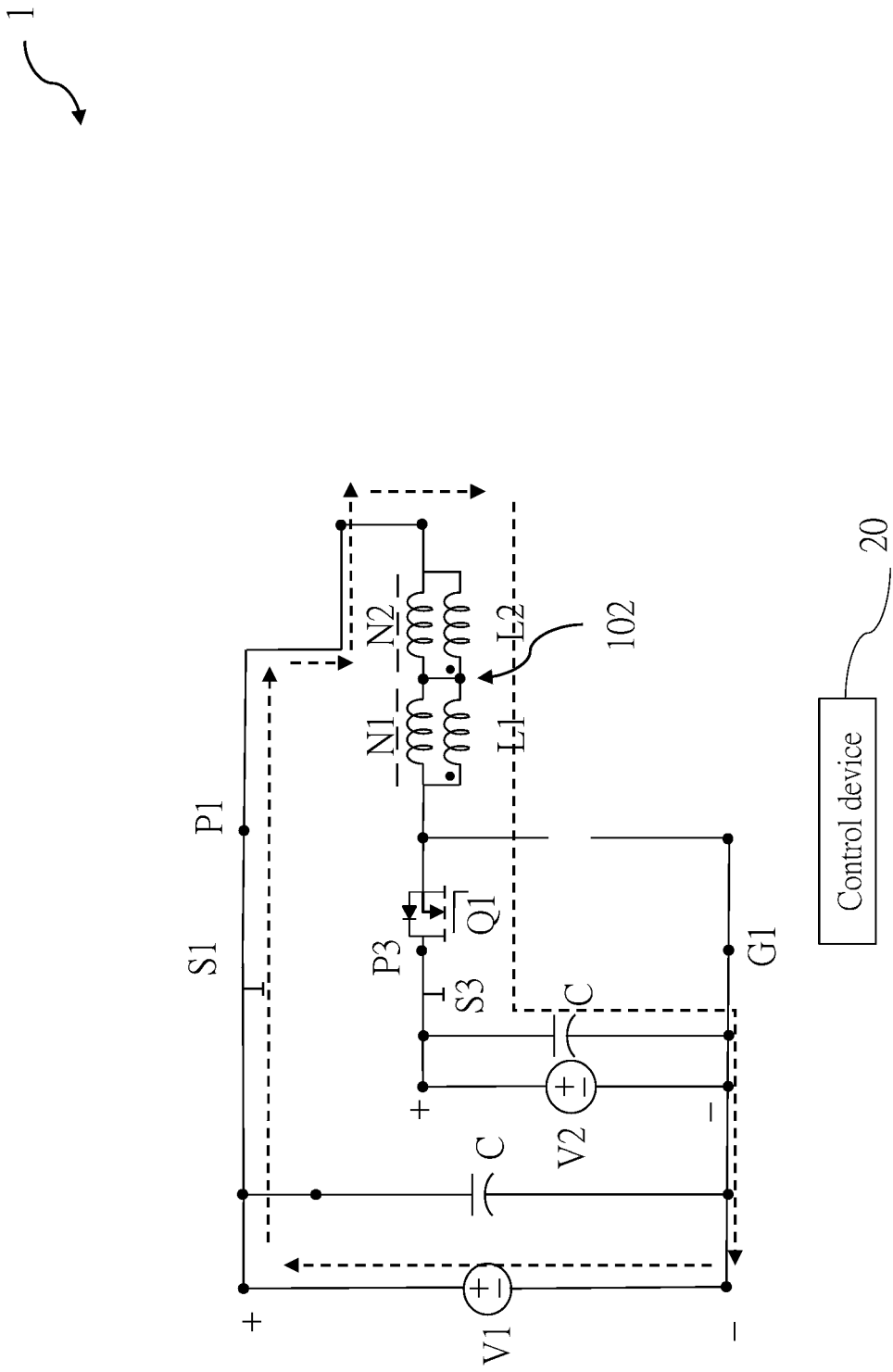
FIG. 5 is a schematic view showing the power converter operates in the second phase of the first mode.

Referring to FIG. 4 and FIG. 5, when the control device 20 controls the switching elements to form the first configuration, the third switching element Q3, the fourth switching element Q4, and the fifth switching element Q5 are cut off, and the first switching element Q1 and the second switching element Q2 start with a first phase of the first configuration and then alternately switch between the first phase and a second phase of the first configuration.

Referring to FIG. 4, when in the first phase of the first configuration, the first switching element Q1 is cut off and the second switching element Q2 switches on, and the first magnetizing inductance L1 and the second magnetizing inductance L2 storage energy. Referring to FIG. 5, when in the second phase of the first configuration, the first switching element Q1 switches on and the second switching element Q2 cut off, and the first magnetizing inductance L1 and the second magnetizing inductance L2 release energy. The first switching element Q1 and the second switching element Q2 are switched between the first phase and the second phase of the first configuration, wherein a switching frequency thereof could be, but not limited to, 50K-200 KHz, and a duty cycle is, but not limited to, 50%. In an embodiment, the switching frequency could be modulated to 50K-400 KHz, and the duty cycle could be modulated to 35-65% by the control device 20.

In this way, a power input to the first contact P1 could be output to the third contact P3 via the first side of the transformer 102. In the current embodiment, the switching of the duty cycle of the first configuration in the first phase and the second phase causes the DC/DC converter 10 to switch between energy storage and energy release via the first magnetizing inductance L1 and the second magnetizing inductance L2 during the duty cycle, thereby the power that the DC power grid V1 inputs to the first contact P1 is boosted, and the third contact point P3 outputs the boosted power. After the power of the DC grid V1 is boosted, the first energy storage system V2 could be charged.

The Second Control Mode

The control device 20 controls the first selection switch S1 and the third selection switch S3 to cut off and controls the second selection switch S2 to switch on, thereby allowing the second contact P2 and the first ground contact G1 to be respectively and conductively connected to the positive terminal and the negative terminal of the DC grid V1, and allowing the fourth contact P4 and the second ground contact G2 to be respectively and conductively connected to the positive terminal and the negative terminal of the second energy storage system V3.

When the control device 20 detects that the voltage of the second energy storage system V3 is smaller than a second predetermined voltage which is 36V as an example, the control device 20 controls the first switching element Q1 to the fifth switching element Q5 to form the second configuration. In the current embodiment, the control device 20 takes the second control mode when the control device 20 determines that the DC grid V1 is in the off-peak power consumption status and detects that the third contact P3 is not coupled to the first energy storage system V2 and the voltage of the second energy storage system V3 is smaller than the second predetermined voltage.

Figure 6:
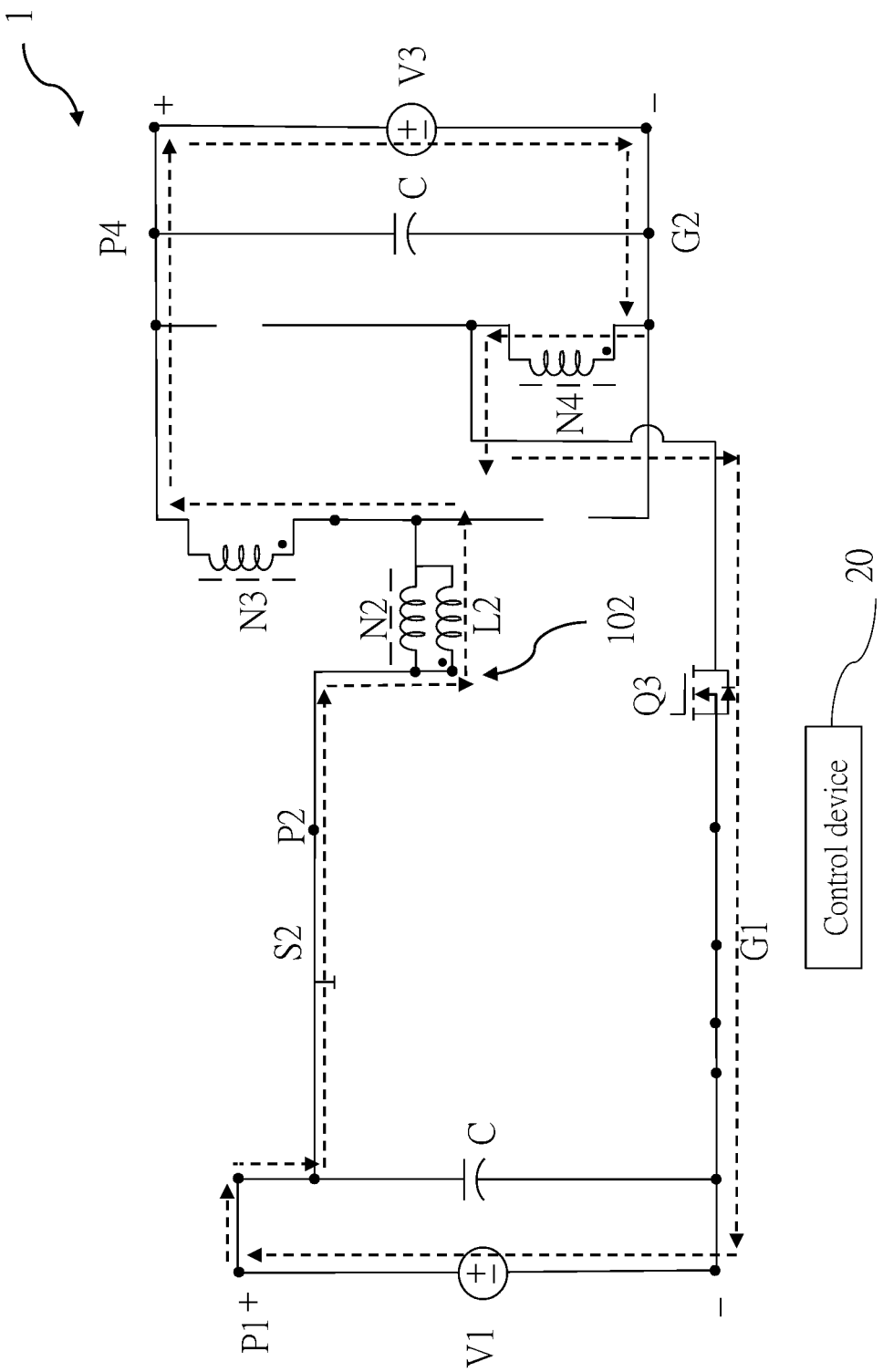
FIG. 6 is a schematic view showing the power converter operates in the first phase of the second mode.
Figure 7:
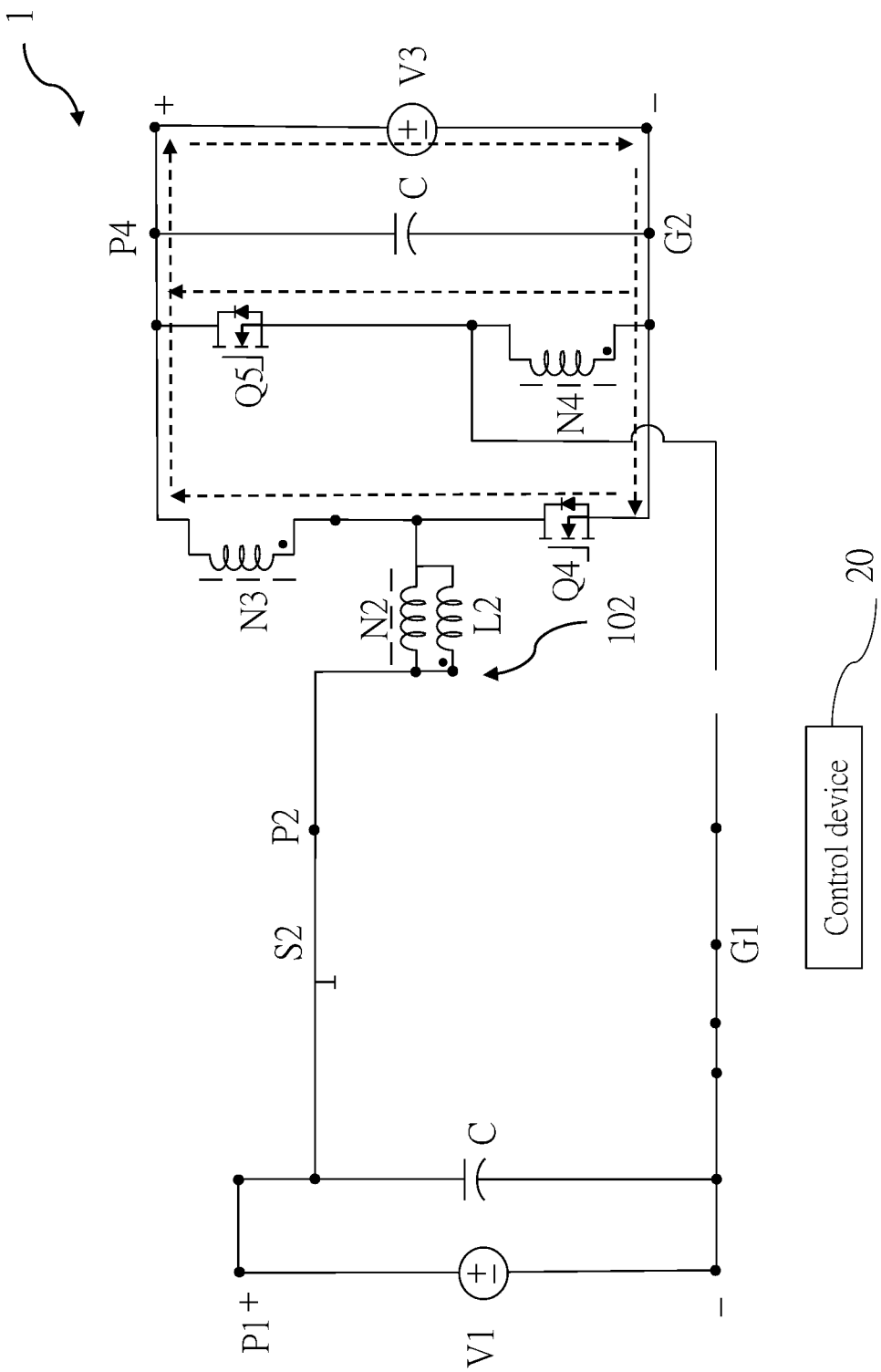
FIG. 7 is a schematic view showing the power converter operates in the second phase of the second mode.

Referring to FIG. 6 and FIG. 7, when the control device 20 controls the switching elements to form the second configuration, the first switching element Q1 and the second switching element Q2 are cut off, and the third switching element Q3, the fourth switching element Q4, and the fifth switching element Q5 start with a first phase of the second configuration, and then alternately switch between the first phase and a second phase of the second configuration.

Referring to FIG. 6, when in the first phase of the second configuration, the third switching element Q3 switches on, and the fourth switching element Q4 and the fifth switching element Q5 cut off. Referring to FIG. 7, when in the second phase of the second configuration, the third switching element Q3 cut off, and the fourth switching element Q4 and the fifth switching element Q5 switch on. The third switching element Q3, the fourth switching element Q4, and the fifth switching element Q5 are switched between the first phase and the second phase of the second configuration, wherein a switching frequency thereof could be, but not limited to, 50K-200 KHz, and a duty cycle is, but not limited to, 50%. In an embodiment, the switching frequency could be modulated to 50K-400 KHz, and the duty cycle could be modulated to 35-65% by the control device 20.

In this way, a power input to the second contact P2 could be output to the second energy storage system V3 via the first side to the second side of the transformer 102. In the current embodiment, the switching of the duty cycle of the second configuration in the first phase and the second phase causes the DC/DC converter 10 to step down the power that the DC grid V1 inputs to the second contact P2 by a difference of a turn number ratio of the second winding N2 and the fourth winding N4 of the transformer 102, and the fourth contact P4 outputs the stepped down power. After the power of the DC grid V1 is stepped down, the second energy storage system V3 could be charged.

The Third Control Mode

The control device 20 controls the first selection switch S1 and the third selection switch S3 to switch on and controls the second selection switch S2 to cut off, thereby allowing the first contact P1 and the first ground contact G1 to be respectively and conductively connected to the positive terminal and the negative terminal of the DC grid V1, and allowing the third contact P3 and the first ground contact G1 to be respectively and conductively connected to the positive terminal and the negative terminal of the first energy storage system V2.

When the control device 20 detects that the voltage of the first energy storage system V2 is greater than a third predetermined voltage which is 720V as an example, the control device 20 controls the first switching element Q1 to the fifth switching element Q5 to form the third configuration. In the current embodiment, the control device 20 takes the third control mode when the control device 20 determines that the DC grid V1 is in the peak power consumption status and the voltage of the first energy storage system V2 is greater than the third predetermined voltage which represents that the first energy storage system V2 is in a state of sufficient power.

Figure 8:
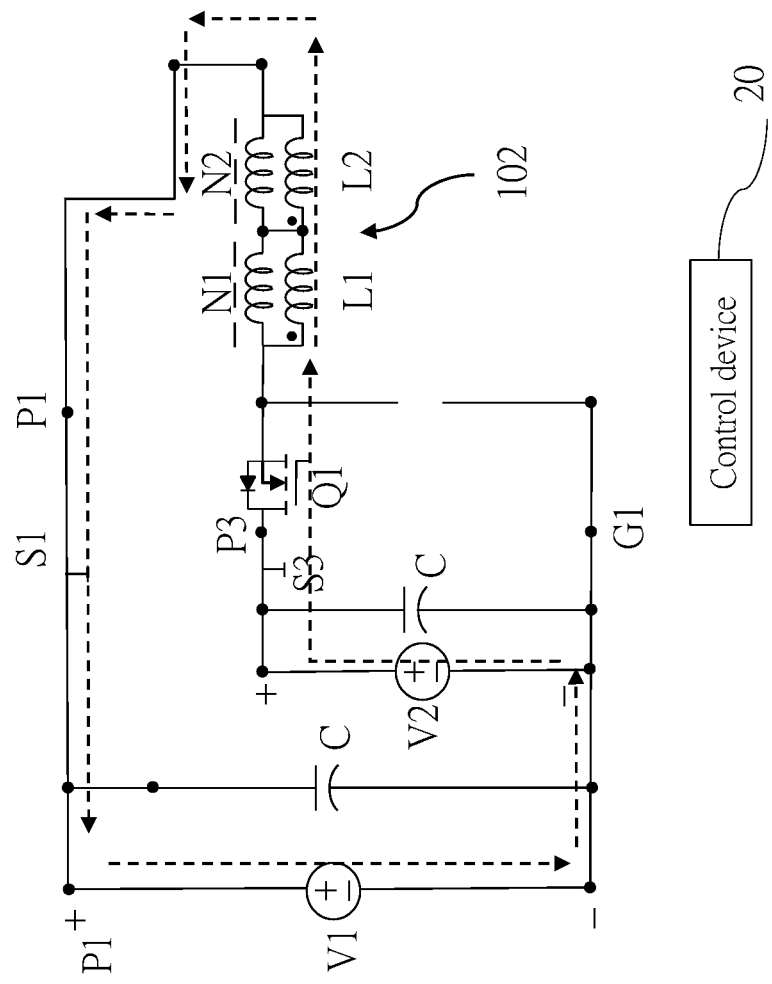
FIG. 8 is a schematic view showing the power converter operates in the first phase of the third mode.
Figure 9:
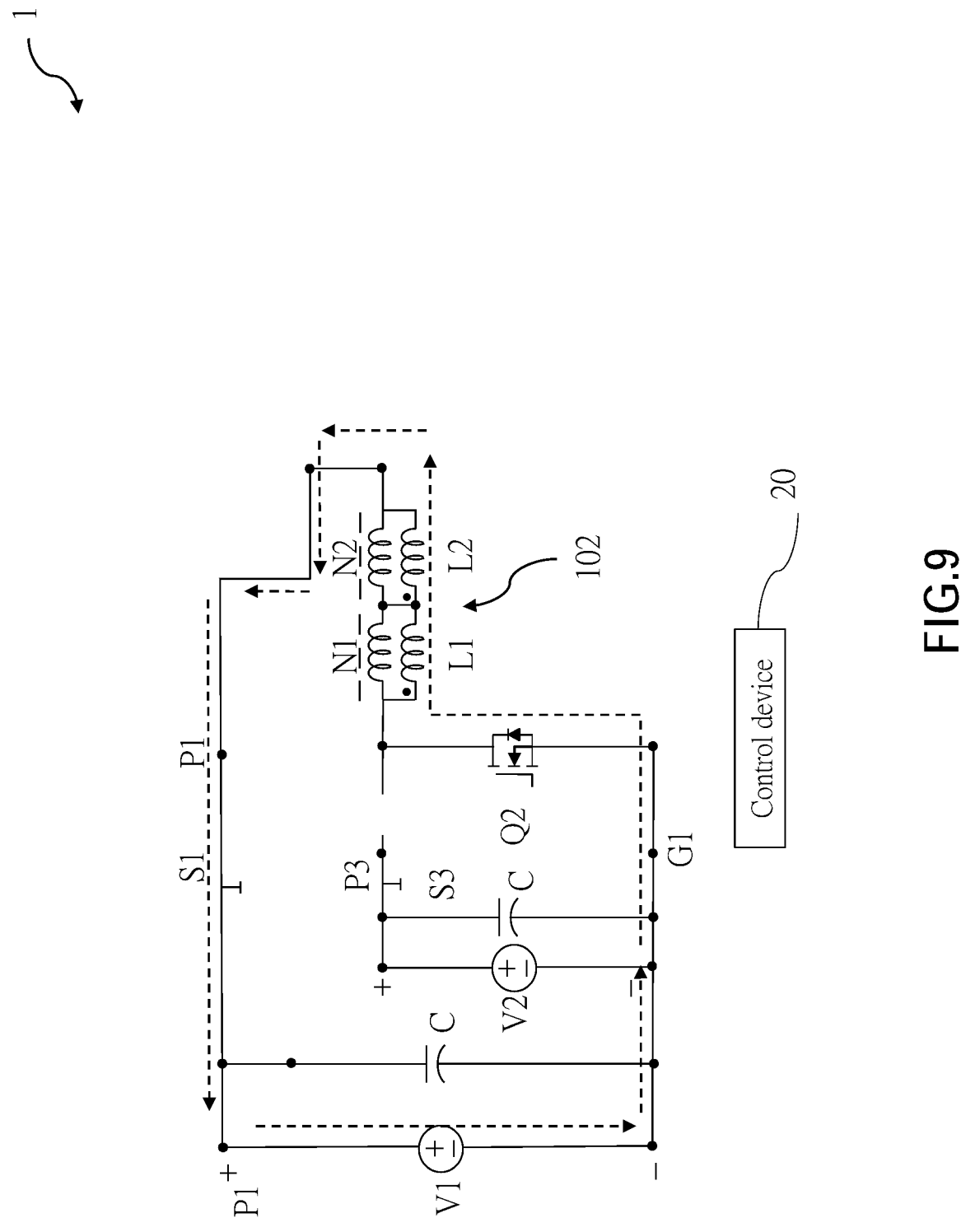

Referring to FIG. 8 and FIG. 9, when the control device 20 controls the switching elements to form the third configuration, the third switching element Q3, the fourth switching element Q4, and the fifth switching element Q5 cut off, and the first switching element Q1 and the second switching element Q2 start with a first phase of the third configuration, and then alternately switch between the first phase and a second phase of the third configuration.

Referring to FIG. 8, when in the first phase of the third configuration, the first switching element Q1 switches on, the second switching element Q2 is cut off, and the first magnetizing inductance L1 and the second magnetizing inductance L2 storage energy. Referring to FIG. 9, when in the second phase of the third configuration, the first switching element Q1 is cut off, the second switching element Q2 switches on, and the first magnetizing inductance L1 and the second magnetizing inductance L2 release energy. The first switching element Q1 and the second switching element Q2 are switched between the first phase and the second phase of the third configuration, wherein a switching frequency thereof could be, but not limited to, 50K-200 KHz, and a duty cycle is, but not limited to, 50%. In an embodiment, the switching frequency could be modulated to 50K-400 KHz, and the duty cycle could be modulated to 35-65% by the control device 20.

In this way, a power input to the third contact P3 could be output to the first contact P1 via the first side of the transformer 102. In the current embodiment, the switching of the duty cycle of the third configuration in the first phase and the second phase causes the DC/DC converter 10 to switch between energy storage and energy release via the first magnetizing inductance L1 and the second magnetizing inductance L2 during the duty cycle, thereby the power that the first energy storage system inputs to the third contact P3 is stepped down, and the first contact P1 outputs the stepped down power. After the power of the first energy storage system V2 is stepped down, the stepped-down power could be supplied to the DC grid V1.

The Fourth Control Mode

The control device 20 controls the first selection switch S1 and the third selection switch S3 to cut off, and the second selection switch S2 to switch on, thereby allowing the second contact P2 and the first ground contact G1 to be respectively and conductively connected to the positive terminal and the negative terminal of the DC grid V1, and allowing the fourth contact P4 and the second ground contact G2 to be respectively and conductively connected to the positive terminal and the negative terminal of the second energy storage system V3.

When the control device 20 detects that the voltage of the second energy storage system V3 is greater than a fourth predetermined voltage which is 60V as an example, the control device 20 controls the first switching element Q1 to the fifth switching element Q5 to form the fourth configuration. In the current embodiment, the control device 20 takes the fourth control mode when the control device 20 determines that the DC grid V1 is in the peak power consumption status and the voltage of the second energy storage system V3 is greater than the fourth predetermined voltage which represents that the second energy storage system V3 is in a state of sufficient power.

Figure 10:
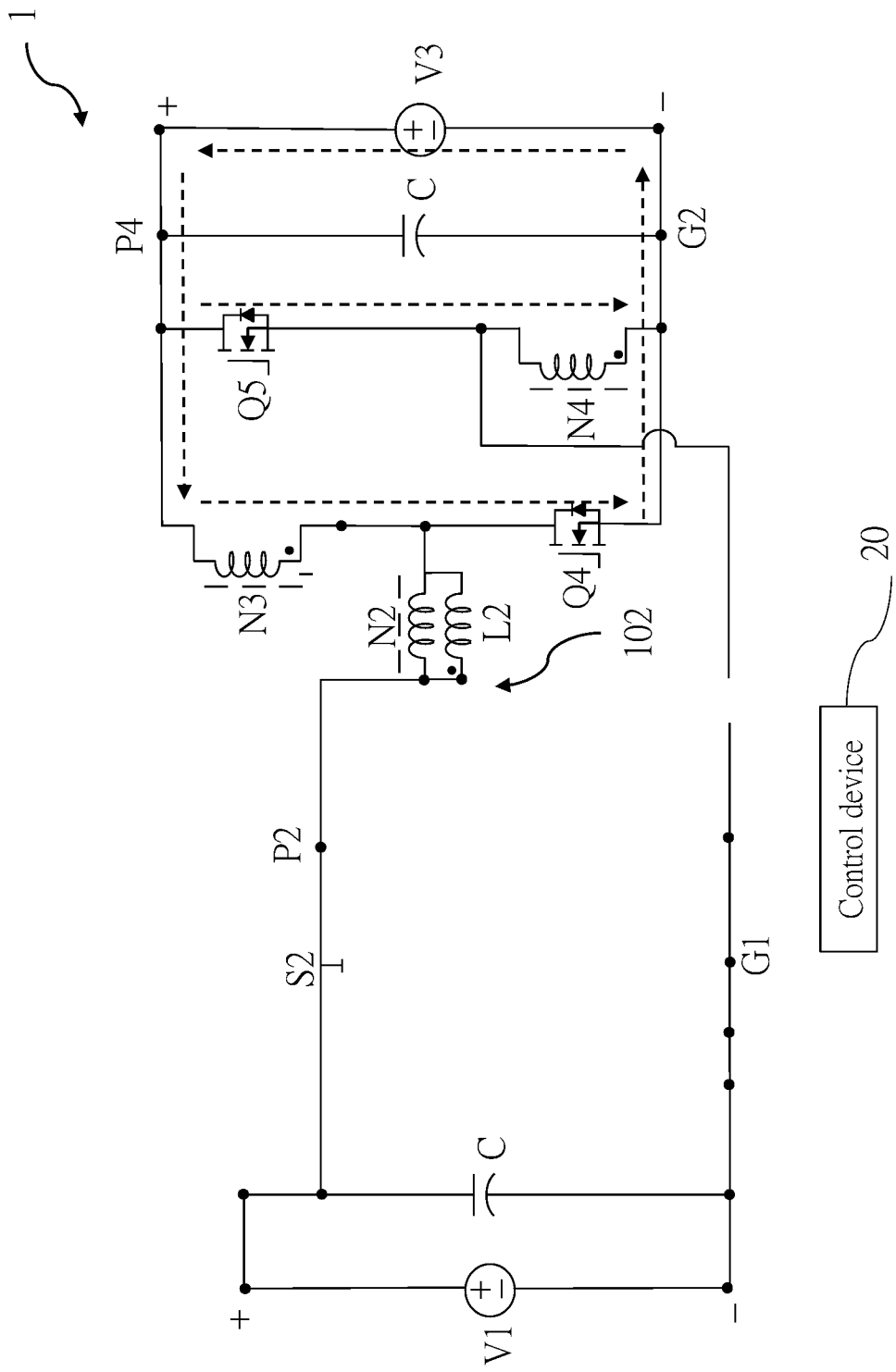
FIG. 10 is a schematic view showing the power converter operates in the first phase of the fourth mode.
Figure 11:
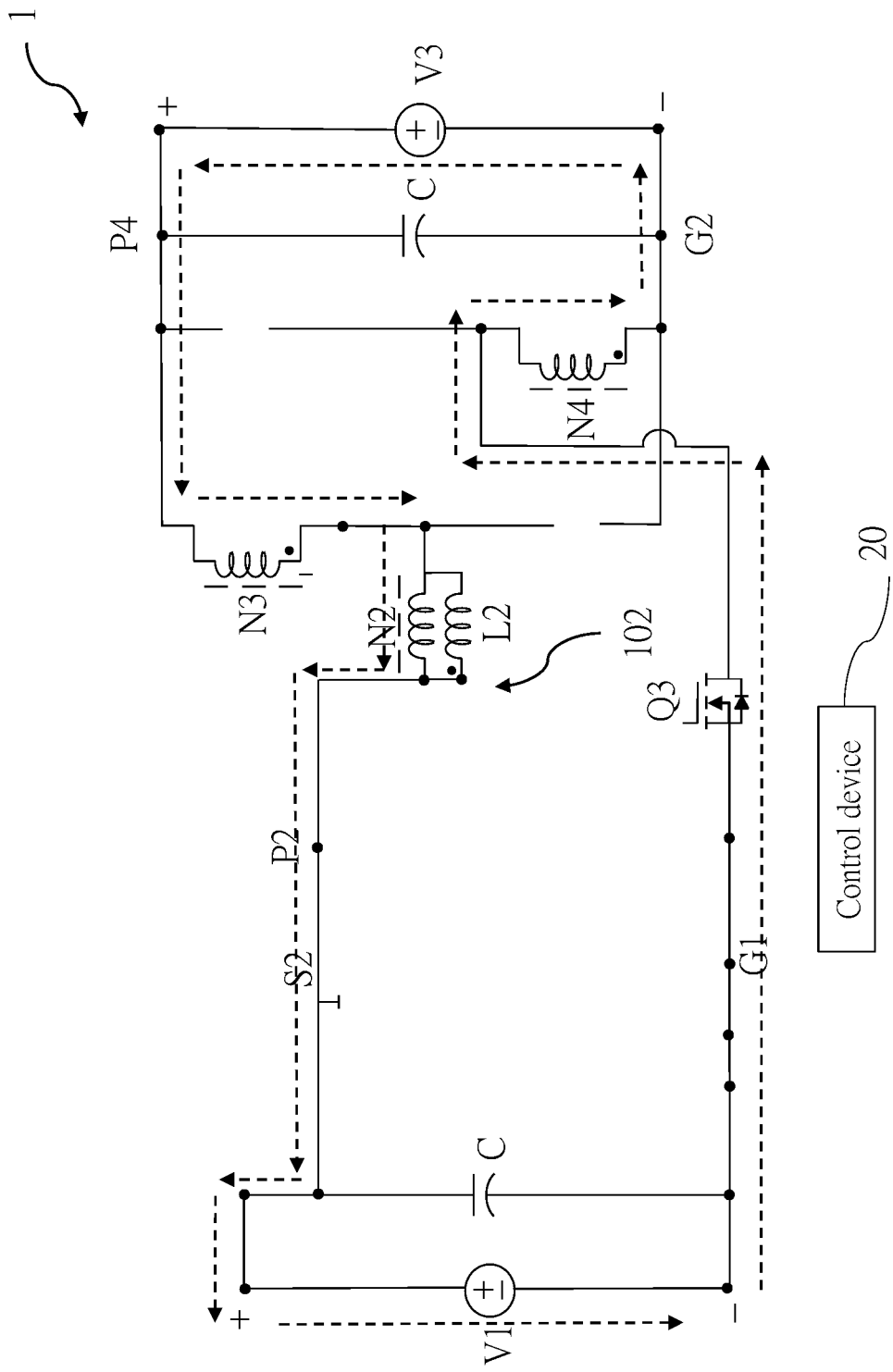
FIG. 11 is a schematic view showing the power converter operates in the second phase of the fourth mode.

Referring to FIG. 10 and FIG. 11, when the control device 20 controls the switching elements to form the fourth configuration, the first switching element Q1 and the second switching element Q2 are cut off, and the third switching element Q3, the fourth switching element Q4, and the fifth switching element Q5 start with a first phase of the fourth configuration, and then alternately switch between the first phase and a second phase of the fourth configuration.

Referring to FIG. 10, when in the first phase of the fourth configuration, the third switching element Q3 is cut off, and the fourth switching element Q4 and the fifth switching element Q5 switch on. Referring to FIG. 11, when in the second phase of the fourth configuration, the third switching element Q3 switches on, and the fourth switching element Q4 and the fifth switching element Q5 cut off. The third switching element Q3, the fourth switching element Q4, and the fifth switching element Q5 are switched between the first phase and the second phase of the fourth configuration, wherein a switching frequency thereof could be, but not limited to, 50K-200 KHz, and a duty cycle is, but not limited to, 50%. In an embodiment, the switching frequency could be modulated to 50K-400 KHz, and the duty cycle could be modulated to 35-65% by the control device 20.

In this way, a power input to the second energy storage system V3 could be output to the DC grid V1 through the second side to the first side of the transformer 102 and through the second contact P2. In the current embodiment, the switching of the duty cycle of the fourth configuration in the first phase and the second phase causes the DC/DC converter 10 to boost the power that the second energy storage system V3 inputs to the fourth contact P4 by a difference of a turn number ratio of the second winding N2 and the fourth winding N4 of the DC/DC converter 10, and the second contact P2 outputs the boosted power. After the power of the second energy storage system V3 is boosted, the boosted power could be supplied to the DC grid V1.

The Fifth Control Mode

The control device 20 controls the first selection switch S1 and the second selection switch S2 to cut off, and the third selection switch S3 to switch on, thereby allowing the third contact P3 and the first ground contact G1 to be respectively and conductively connected to the positive terminal and the negative terminal of the first energy storage system V2, and allowing the fourth contact P4 and the second ground contact G2 to be respectively and conductively connected to the positive terminal and the negative terminal of the second energy storage system V3. In the current embodiment, the control device 20 takes the fifth control mode when the control device 20 detects that the voltage of the first energy storage system V2 is greater than a fifth predetermined voltage which is 480V as an example, representing that the first energy storage system V2 is in a state of sufficient power.

Figure 12:
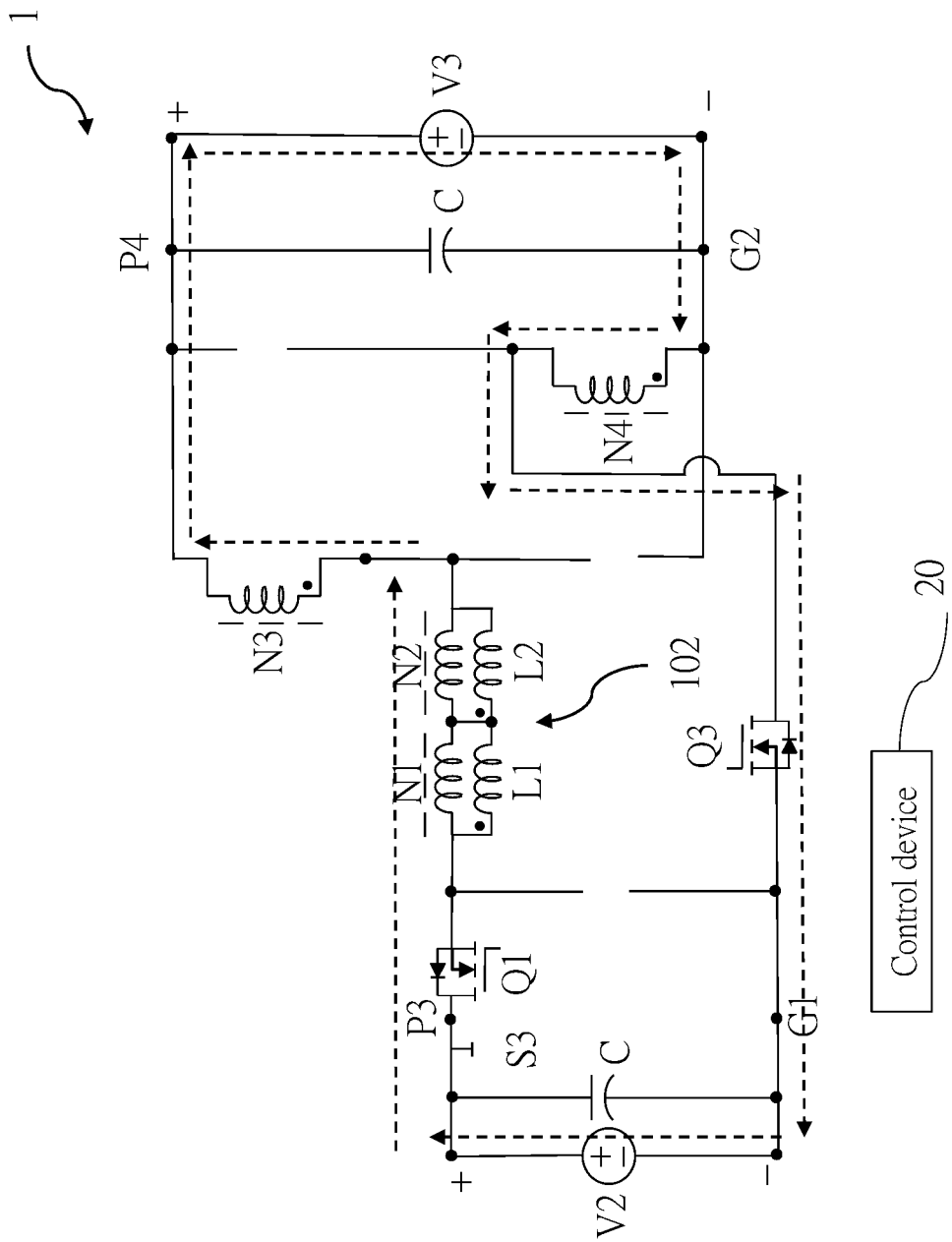
FIG. 12 is a schematic view showing the power converter operates in the first phase of the fifth mode.
Figure 13:
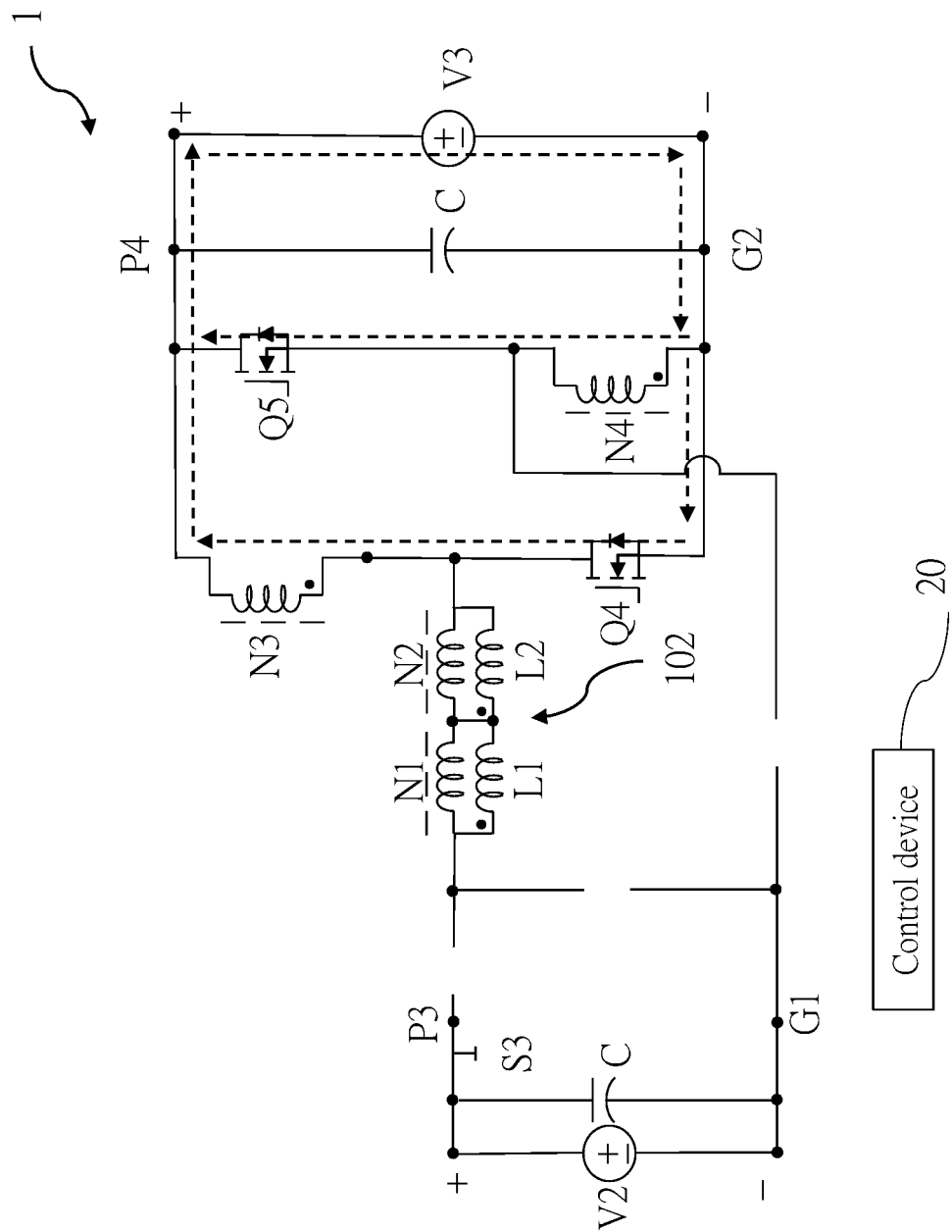
FIG. 13 is a schematic view showing the power converter operates in the second phase of the fifth mode.

Referring to FIG. 12 and FIG. 13, when the control device 20 controls the switching elements to form the fifth configuration, the second switching element Q2 is cut off, and the first switching element Q1, the third switching element Q3, the fourth switching element Q4, and the fifth switching element Q5 start with a first phase of the fifth configuration, and then alternately switch between the first phase and a second phase of the fifth configuration.

Referring to FIG. 12, when in the first phase of the fifth configuration, the first switching element Q1 and the third switching element Q3 switch on, and the fourth switching element Q4 and the fifth switching element Q5 cut off. Referring to FIG. 13, when in the second phase of the fifth configuration, the fourth switching element Q4 and the fifth switching element Q5 switch on, and the first switching element Q1 and the third switching element Q3 are cut off. The first switching element Q1, the third switching element Q3, the fourth switching element Q4, and the fifth switching element Q5 are switched between the first phase and the second phase of the fifth configuration, wherein a switching frequency thereof could be, but not limited to, 50K-200 KHz, and a duty cycle is, but not limited to, 50%. In an embodiment, the switching frequency could be modulated to 50K-400 KHz, and the duty cycle could be modulated to 35-65% by the control device 20.

In this way, a power input to the first energy storage system V2 could be output to the second energy storage system V3 through the first side to the second side of the transformer 102. In the current embodiment, the switching of the duty cycle of the fifth configuration in the first phase and the second phase causes the DC/DC converter 10 to step down the power that the first energy storage system V2 inputs to the third contact P3 by a difference of a turn number ratio of the first winding N1 and the third winding N3 and a difference of a turn number ratio of the second winding N2 and the fourth winding N4, and the fourth contact P4 outputs the stepped down power. After the power of the first energy storage system V2 is stepped down, the stepped-down power could charge the second energy storage system V3.

The Sixth Control Mode

The control device 20 controls the first selection switch S1 and the second selection switch S2 to cut off, and the third selection switch S3 to switch on, thereby allowing the third contact P3 and the first ground contact G1 to be respectively and conductively connected to the positive terminal and the negative terminal of the first energy storage system V2, and allowing the fourth contact P4 and the second ground contact G2 to be respectively and conductively connected to the positive terminal and the negative terminal of the second energy storage system V3.

When the control device 20 detects that the voltage of the second energy storage system V3 is greater than a sixth predetermined voltage which is 36V as an example, the control device 20 controls the first switching element Q1 to the fifth switching element Q5 to form the sixth configuration. In the current embodiment, the control device 20 takes the sixth control mode when the control device 20 determines that the first energy storage system V2 connected to the third contact P3 is in an insufficient power state and the voltage of the second energy storage system V3 is greater than the sixth predetermined voltage, thereby activating the second energy storage system V3 to supply emergency power.

Figure 14:
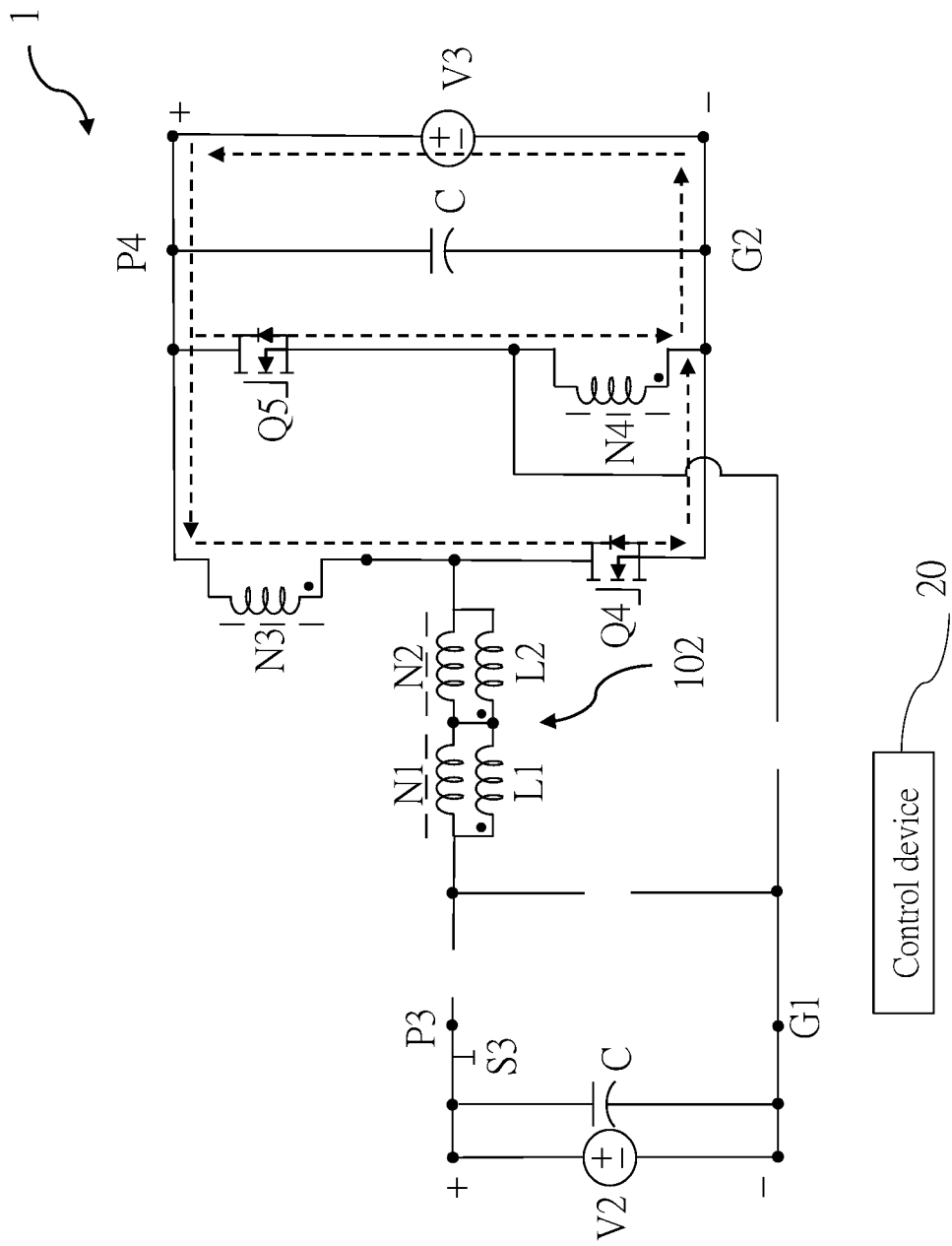
FIG. 14 is a schematic view showing the power converter operates in the first phase of the sixth mode.
Figure 15:
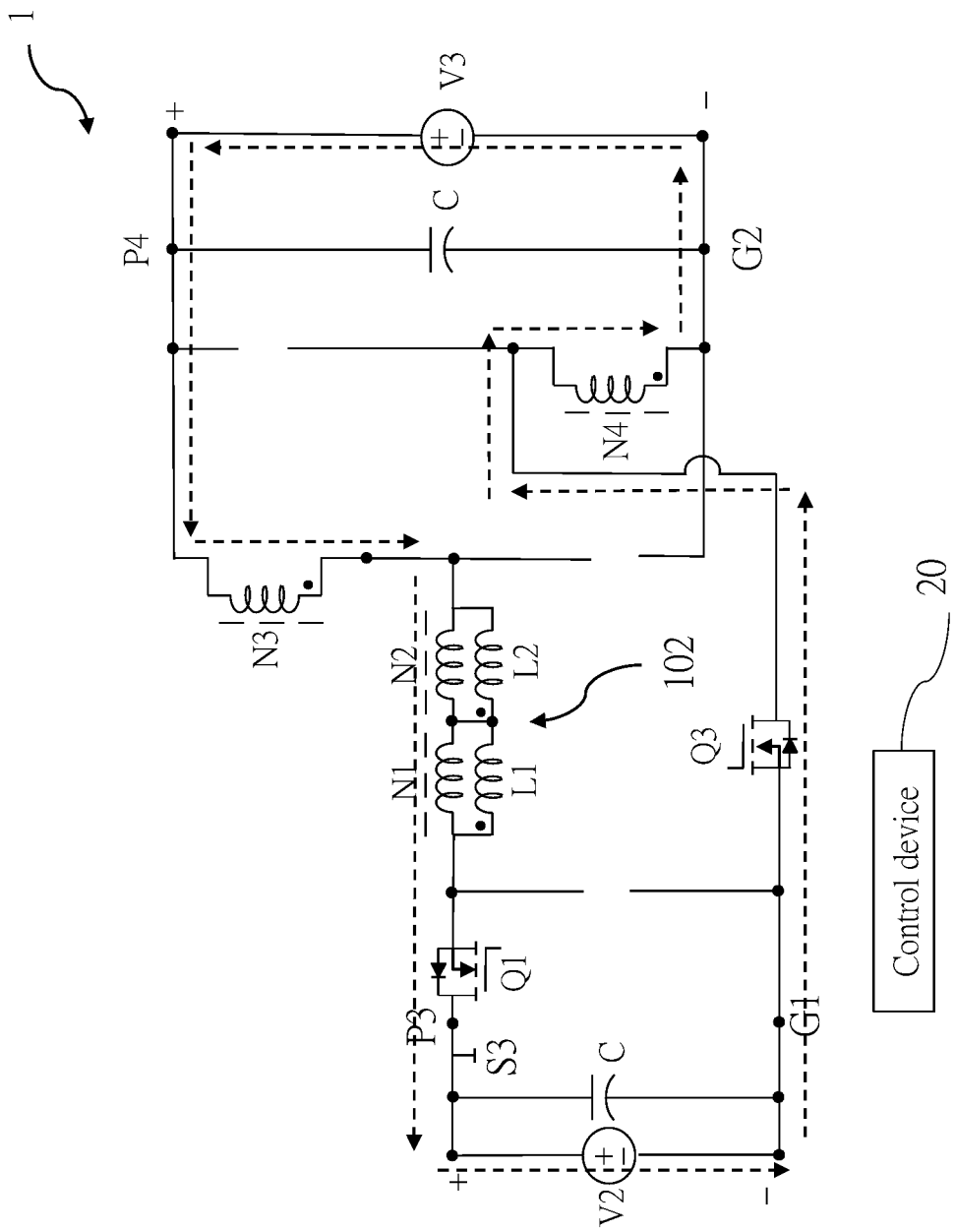
FIG. 15 is a schematic view showing the power converter operates in the second phase of the sixth mode.

Referring to FIG. 14 and FIG. 15, when the control device 20 controls the switching elements to form the sixth configuration, the second switching element Q2 is cut off, and the first switching element Q1, the third switching element Q3, the fourth switching element Q4, and the fifth switching element Q5 start with a first phase of the sixth configuration, and then alternately switch between the first phase and a second phase of the sixth configuration.

Referring to FIG. 14, when in the first phase of the sixth configuration, the fourth switching element Q4 and the fifth switching element Q5 switch on, and the first switching element Q1 and the third switching element Q3 are cut off. Referring to FIG. 15, when in the second phase of the sixth configuration, the first switching element Q1 and the third switching element Q3 switch on, and the fourth switching element Q4 and the fifth switching element Q5 are cut off. The first switching element Q1, the third switching element Q3, the fourth switching element Q4, and the fifth switching element Q5 are switched between the first phase and the second phase of the sixth configuration, wherein a switching frequency thereof could be, but not limited to, 50K-200 KHz, and a duty cycle is, but not limited to, 50%. In an embodiment, the switching frequency could be modulated to 50K-400 KHz, and the duty cycle could be modulated to 35-65% by the control device 20.

In this way, a power input to the second energy storage system V3 could be output to the first energy storage system V2 through the second side to the first side of the transformer 102. In the current embodiment, the switching of the duty cycle of the sixth configuration in the first phase and the second phase causes the DC/DC converter 10 to boost the power that the second energy storage system V3 inputs to the fourth contact P4 by a difference of a turn number ratio of the first winding N1 and the third winding N3, and the third contact P3 outputs the boosted power. After the power of the second energy storage system V3 is boosted, the boosted power could charge the first energy storage system V2.

With the aforementioned design, the power converter 1 of the present invention has the DC grid V1, the first energy storage system V2, and the second energy storage system V3 electrically connected to the switching elements, wherein the power of the DC grid V1 could be transmitted to the first energy storage system V2 or the second energy storage system V3 by switching the switching elements via the control device 20 and by boosting or stepping down the power via the transformer 102. The control device 20 controls the switching elements to switch on or off to achieve effective management and distribution. Additionally, the first energy storage system V2 could transmit power to the DC grid V1 or the second energy storage system V3 through the transformer 102 and by switching the switching elements, and the second energy storage system V3 could transmit power to the DC grid V1 or the first energy storage system V2 through the transformer 102 and by switching the switching elements, thereby achieving the effect of two-way power transmission.

It must be pointed out that the embodiments described above are only some preferred embodiments of the present invention. All equivalent structures which employ the concepts disclosed in this specification and the appended claims should fall within the scope of the present invention.

What is claimed is:

1. A power converter comprising:
a first contact, a second contact, a third contact, a fourth contact, a first ground contact, and a second ground contact;
a transformer comprising a first side and a second side, wherein the first side has a first winding and a second winding; the first winding has a first end and a second end; the second winding has a first end and a second end; the second side has a third winding and a fourth winding; the third winding has a first end and a second end; the fourth winding has a first end and a second end; wherein the second end of the third winding is electrically connected to the fourth contact, and the first end of the fourth winding is electrically connected to the second ground contact;
a first switching element having a first end and a second end, wherein the first end of the first switching element is electrically connected to the third contact, and the second end of the first switching element is electrically connected to the first end of the first winding;
a second switching element having a first end and a second end, wherein the first end of the second switching element is electrically connected to the first end of the first winding and the second end of the first switching element; the second end of the second switching element is electrically connected to the first ground contact;
a third switching element having a first end and a second end, wherein the second end of the third switching element is electrically connected to the second end of the second switching element and the first ground contact; the first end of the third switching element is electrically connected to the second end of the fourth winding;
a fourth switching element having a first end and a second end, wherein the first end of the fourth switching element is electrically connected to the second end of the second winding, the first end of the third winding, and the first contact; the second end of the fourth switching element is electrically connected to the first end of the fourth winding and the second ground contact;
a fifth switching element having a first end and a second end, wherein the first end of the fifth switching element is electrically connected to the second end of the third winding and the fourth contact; the second end of the fifth switching element is electrically connected to the second end of the fourth winding and the first end of the third switching element;
wherein the first switching element, the second switching element, the third switching element, the fourth switching element, and the fifth switching element are controllable to form one of a plurality of configurations; the configurations comprise a first configuration and a second configuration;
wherein when in the first configuration, the third switching element, the fourth switching element, and the fifth switching element are cut off, and the first switching element and the second switching element start with a first phase of the first configuration, and then alternately switch between the first phase of the first configuration and a second phase of the first configuration; when in the first phase of the first configuration, the first switching element cuts off, and the second switching element switches on, while when in the second phase of the first configuration, the first switching element switches on, and the second switching element cuts off, thereby allowing a power input to the first contact to be transmitted to the third contact through the first side of the transformer;

wherein when in the second configuration, the first switching element and the second switching element are cut off, and the third switching element, the fourth switching element, and the fifth switching element start with a first phase of the second configuration, and then alternately switch between the first phase of the second configuration and a second phase of the second configuration; when in the first phase of the second configuration, the third switching element switches on, and the fourth switching element and the fifth switching element cut off, while when in the second phase of the second configuration, the third switching element cuts off, and the fourth switching element and the fifth switching element switch on, thereby allowing a power input to the second contact to be transmitted to the fourth contact through the first side to the second side of the transformer.

2. The power converter as claimed in claim 1, further comprising a control device electrically connected to the first switching element, the second switching element, the third switching element, the fourth switching element, and the fifth switching element, wherein the first contact is coupled to a positive terminal of a DC power source, and the first ground contact is coupled to a negative terminal of the DC power source; the third contact and the first ground contact are respectively and detachably coupled to a positive terminal and a negative terminal of a first energy storage system; the control device controls the first switching element to the fifth switching element to form the first configuration when the control device detects that a voltage of the first energy storage system is smaller than a first predetermined voltage.

3. The power converter as claimed in claim 2, wherein the second contact is coupled to the positive terminal of the DC power source, and the first ground contact is coupled to the negative terminal of the DC power source; the fourth contact and the second ground contact are respectively coupled to a positive terminal and a negative terminal of a second energy storage system; the control device controls the first switching element to the fifth switching element to form the second configuration when the control device detects that the third contact and the first ground contact are not coupled to the first energy storage system and a voltage of the second energy storage system is smaller than a second predetermined voltage.

4. The power converter as claimed in claim 1, wherein the configurations further comprises a third configuration; when in the third configuration, the third switching element, the fourth switching element, and the fifth switching element are cut off, and the first switching element and the second switching element start with a first phase of the third configuration, and then alternately switch between the first phase of the third configuration and a second phase of the third configuration; when in the first phase of the third configuration, the first switching element switches on, and the second switching element cuts off, while when in the second phase of the third configuration, the first switching element cuts off, and the second switching element switches on, thereby allowing a power input to the third contact to be transmitted to the first contact through the first side of the transformer.

5. The power converter as claimed in claim 4, further comprising a control device electrically connected to the first switching element, the second switching element, the third switching element, the fourth switching element, and the fifth switching element, wherein the first contact is coupled to a positive terminal of a DC power source, and the first ground contact is coupled to a negative terminal of the DC power source; the third contact and the first ground contact are respectively and detachably coupled to a positive terminal and a negative terminal of a first energy storage system; the control device controls the first switching element to the fifth switching element to form the third configuration when the control device detects that a voltage of the first energy storage system is greater than a third predetermined voltage.

6. The power converter as claimed in claim 1, wherein the configurations further comprising another configuration; when in the another configuration, the first switching element and the second switching element are cut off, and the third switching element, the fourth switching element, and the fifth switching element start with a first phase of the another configuration, and then alternately switch between the first phase and a second phase of the another configuration; when in the first phase of the another configuration, the third switching element cuts off, and the fourth switching element and the fifth switching element switch on, while in the second phase of the another configuration, the third switching element switches on, and the fourth switching element and the fifth switching element cut off, thereby allowing a power input to the fourth contact to be transmitted to the second contact through the second side to the first side of the transformer.

7. The power converter as claimed in claim 6, further comprising a control device electrically connected to the first switching element, the second switching element, the third switching element, the fourth switching element, and the fifth switching element, wherein the fourth contact and the second ground contact are coupled to an energy storage system, and the second contact is coupled to a positive terminal of a DC power source, and the first ground contact is coupled to a negative terminal of the DC power source; the control device controls the first switching element to the fifth switching element to form the another configuration when the control device detects that a voltage of the energy storage system is greater than a predetermined voltage.

8. The power converter as claimed in claim 1, wherein the configurations further comprises another configuration; when in the another configuration, the second switching element cuts off, and the first switching element, the third switching element, the fourth switching element, and the fifth switching element start with a first phase of the another configuration, and then alternately switch between the first phase and a second phase of the another configuration; when in the first phase of the another configuration, the first switching element and the third switching element switch on, and the fourth switching element and the fifth switching element cut off, while when in the second phase of the another configuration, the fourth switching element and the fifth switching element switch on, and the first switching element and the third switching element cut off, thereby allowing a power input to the third contact to be transmitted to the fourth contact through the first side to the second side of the transformer.

9. The power converter as claimed in claim 8, further comprising a control device electrically connected to the first switching element, the second switching element, the third switching element, the fourth switching element, and the fifth switching element, wherein the third contact and the first ground contact are coupled to a first energy storage system, and the fourth contact and the second ground contact are coupled to a second energy storage system; the control device controls the first switching element to the fifth switching element to form the another configuration when the control device detects that a voltage of the first energy storage system is greater than a predetermined voltage.

10. The power converter as claimed in claim 1, wherein the configurations further comprises another configuration; when in the another configuration, the second switching element cuts off, and the first switching element, the third switching element, the fourth switching element, and the fifth switching element start with a first phase of the another configuration, and then alternately switch between the first phase and a second phase of the another configuration; when in the first phase of the another configuration, the fourth switching element and the fifth switching element switch on, and the first switching element and the third switching element cut off, while when in the second phase of the another configuration, the first switching element and the third switching element switch on, and the fourth switching element and the fifth switching element cut off, thereby allowing a power input to the fourth contact to be transmitted to the third contact through the second side to the first side of the transformer.

11. The power converter as claimed in claim 10, further comprising a control device electrically connected to the first switching element, the second switching element, the third switching element, the fourth switching element, and the fifth switching element, wherein the third contact and the first ground contact are coupled to a first energy storage system, and the fourth contact and the second ground contact are coupled to a second energy storage system; the control device controls the first switching element to the fifth switching element to form the another configuration when the control device detects that a voltage of the second energy storage system is greater than a predetermined voltage.

\* \* \* \* \*